United States Patent
Querejeta Andueza

(10) Patent No.: US 9,976,670 B2
(45) Date of Patent: May 22, 2018

(54) GAS COCK

(71) Applicant: COPRECITEC, S.L., Aretxbaleta (ES)

(72) Inventor: Félix Querejeta Andueza, Hendaye (FR)

(73) Assignee: Copreci, S. Coop., Aretxbaleta (ES)

( * ) Notice: Subject to any disclaimer, the term of this patent is extended or adjusted under 35 U.S.C. 154(b) by 8 days.

(21) Appl. No.: 15/427,872

(22) Filed: Feb. 8, 2017

(65) Prior Publication Data

US 2017/0234448 A1 Aug. 17, 2017

(30) Foreign Application Priority Data

Feb. 11, 2016 (EP) .................... 16382057

(51) Int. Cl.
*F16K 31/05* (2006.01)
*F16K 31/06* (2006.01)
*F16K 37/00* (2006.01)

(52) U.S. Cl.
CPC .......... *F16K 31/0655* (2013.01); *F16K 31/05* (2013.01)

(58) Field of Classification Search
CPC .. F16K 31/0655; F16K 31/05; F16K 37/0025; F16K 37/0041
USPC ....................... 251/129.03, 129.16
See application file for complete search history.

(56) References Cited

U.S. PATENT DOCUMENTS

| | | | | |
|---|---|---|---|---|
| 2,695,154 A * | 11/1954 | Dillman | ............ | F16K 31/0655 251/129.03 |
| 6,666,429 B2 * | 12/2003 | Fukano | ............ | F16K 31/0655 251/129.04 |
| 8,783,650 B2 * | 7/2014 | Querejeta Andueza | ............ | F16K 31/0644 251/129.02 |
| 2016/0265677 A1 * | 9/2016 | Querejeta Andueza | ............ | F16K 31/0672 |
| 2016/0334029 A1 * | 11/2016 | French | ............ | G01D 5/16 |

FOREIGN PATENT DOCUMENTS

| | | | | |
|---|---|---|---|---|
| EP | 1657492 A2 * | 5/2006 | ............ | F24C 3/126 |
| EP | 2634485 A1 | 9/2013 | | |
| WO | 2006114675 A2 | 11/2006 | | |

OTHER PUBLICATIONS

European Search Report in corresponding European Patent Application No. 16382057, dated Aug. 1, 2016.

* cited by examiner

*Primary Examiner* — Seth W Mackay-Smith
(74) *Attorney, Agent, or Firm* — Edell, Shapiro & Finnan, LLC

(57) ABSTRACT

A gas cock that according to some embodiments includes an electromagnetic actuator having an electrically conductive static element and an electrically conductive moving element. The gas cock has a closure element that is attached to and moves with the moving element. The gas cock has an actuator shaft that in a first position does not contact the moving element, and in a second position pushes against the moving element to cause the moving element to make contact with the static element. The static element is electrically coupled to a signal line. When the actuator shaft is in the second position the closure element is positioned to permit gas flow through the gas cock and the actuator shaft is electrically coupled with the signal line.

20 Claims, 4 Drawing Sheets

GAS COCK

CROSS-REFERENCE TO RELATED APPLICATIONS

This application relates to and claims the benefit and priority to European Patent Application No. 16382057, filed Feb. 11, 2016

TECHNICAL FIELD

This disclosure relates to gas cocks comprising an electromagnetic valve for allowing or preventing the passage of gas therethrough.

BACKGROUND

Gas appliances with electromagnetic valves used for allowing or preventing the passage of gas towards a gas burner of the appliance itself are known. The electromagnetic valve is arranged between a gas source and the gas burner, allowing the passage of gas therethrough from the gas source to the gas burner in an opening position, and preventing said passage of gas in a closing position. Valves of this type comprise a static part, a moving part and a coil, the moving and static parts being metallic. When the moving part moves, changing position, the electromagnetic valve goes from one position to the other (from the opening position to the closing position, or vice versa). By controlling the actuation of the coil, the movement of the moving part can be controlled, since an electric field is generated, drawing the moving part towards the static part, keeping the moving part adhered to the static part or repelling the moving part away from the static part. One of these valves is disclosed in European Publication No. EP2634485A1 of the same applicant, for example.

Generally, these valves are controlled by control means present in the gas appliance, and, logically, the control means is responsible for opening the gas passage once a user has required doing so. Gas appliances generally comprise a manual actuator for a user to manually indicate that they want to operate the appliance, and some of these actuators comprise cocks with a shaft which is pushed by the user to manually open the gas passage. The control means detects this actuation by the user, and acts in a controlled manner on the electromagnetic valve.

European Publication No. EP1657492A2 discloses a gas appliance of this type, comprising at least one gas cock provided for regulating the amount of gas for a gas burner. The gas cock comprises a cock shaft, an electromagnetic valve and a position sensor, the gas cock being able to be activated by means of an activation button through the cock shaft causing the movement of the cock shaft. The electromagnetic valve can be taken to the opening position by means of the pressure activation of the cock shaft through the activation button. The position sensor is configured like an electric switch to close a signal line reaching the control device when the cock shaft is pressure-activated. The position sensor records an opening position of the electromagnetic valve and transmits a corresponding opening signal to a control device, which thereby detects the action of the user. The electric switch is configured as a valve plunger of the electromagnetic valve which, with pressure activation of the gas cock, comes into contact with a terminal end of the signal line.

SUMMARY OF THE DISCLOSURE

According to some embodiments a gas cock comprising an electromagnetic valve is provided.

The gas cock further comprises an electromagnetic valve which allows the passage of gas therethrough in an opening position and prevents such passage in a closing position, and a signal line. The gas cock further comprises a cock shaft that moves towards the electromagnetic valve when the gas cock is pressure-actuated, causing said electromagnetic valve to go to the opening position.

The electromagnetic valve comprises a static element, a coil wound around the static element, and a moving element which is electrically connected to the signal line, which is arranged between the cock shaft and the static element, and which moves being pushed by the cock shaft when the latter moves as the gas cock is pressure-activated, the electromagnetic valve thereby being caused to go to the opening position.

The signal line is thereby electrically connected to the cock shaft through the static element and the moving element of the electromagnetic valve when the gas cock is pressure-activated, an opening signal representative of said electrical connection thereby being transmitted to the control device through the signal line.

Therefore, in a simple manner requiring a simple construction of the gas cock the pressure opening (generally manual) of the electromagnetic valve is detected automatically, which allows safely and effectively controlling the passage of gas towards the gas burner. The electromagnetic valve does not require a design specific for the cock shaft and the signal line to be electrically connected to one another and, in response, for the transmission of a corresponding opening signal, which facilitates the construction and/or assembly, maintenance and reliability of the gas cock.

These and other advantages and features of the invention will become evident in view of the drawings and the detailed description of the invention.

DETAILED DESCRIPTION

Figure 1:
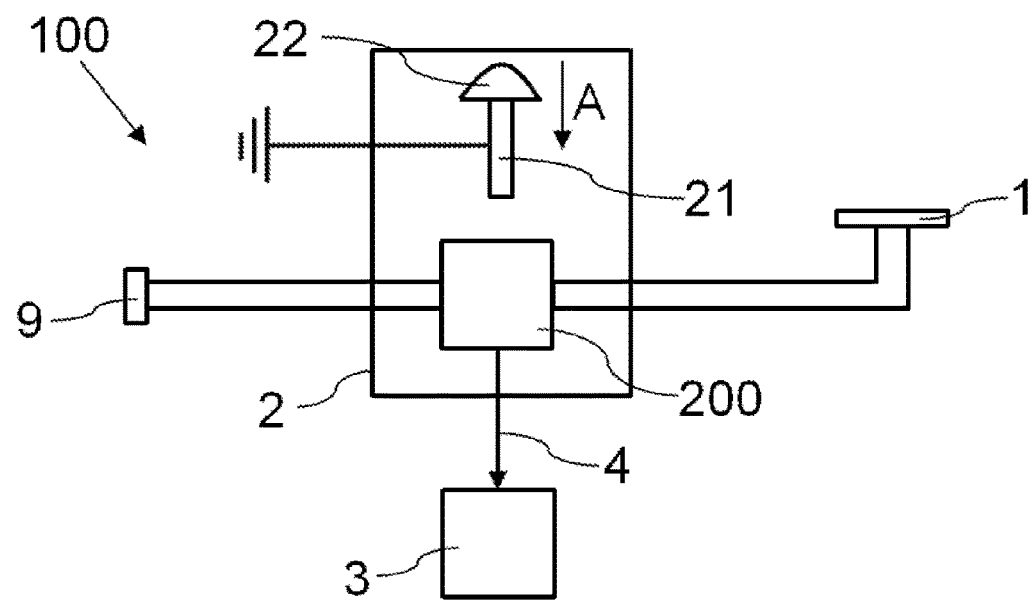
FIG. 1 schematically shows an embodiment of the gas cock with an electromagnetic valve in a closing position.
Figure 2:
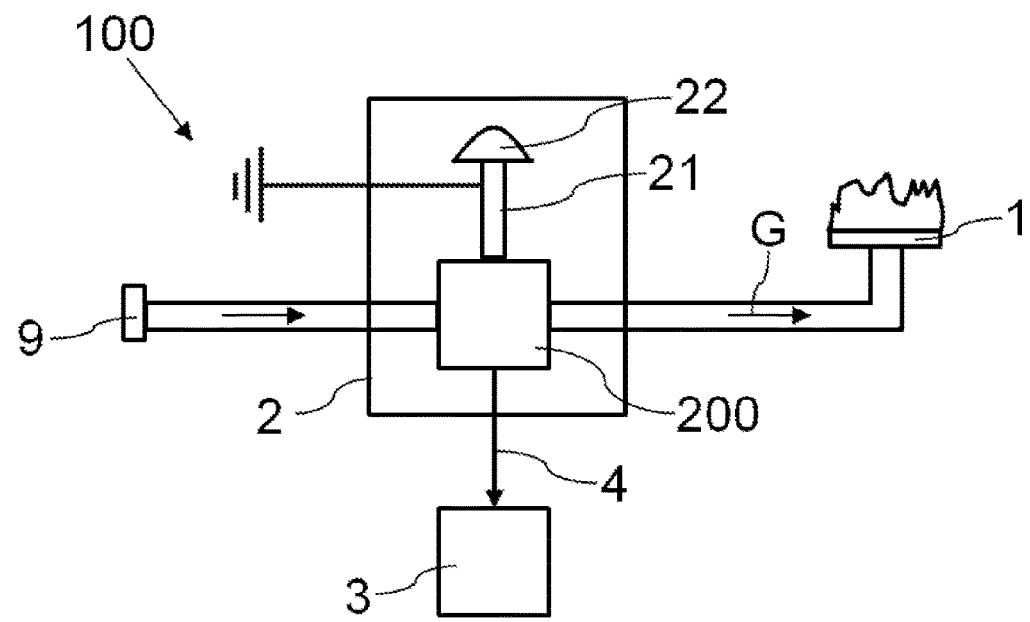
FIG. 2 schematically shows the gas cock of FIG. 1, with the electromagnetic valve in an opening position.

FIGS. 1 and 2 schematically show an embodiment of the gas cock 2 of the invention arranged in a gas appliance 100. The gas appliance 100 comprises at least one gas burner 1 fluidically communicated with a gas intake 9 of the gas appliance 100 itself, which can be connected to a gas supply source, for example, through the gas cock 2, and said gas cock 2 is suitable for allowing or preventing the passage of gas to said gas burner 1 from the gas intake 9. The gas appliance 100 can be a cooktop, a barbeque, a heater or any other appliance requiring gas, a burner and a gas cock (for opening the gas passage to the burner) for operation thereof.

Figure 3:
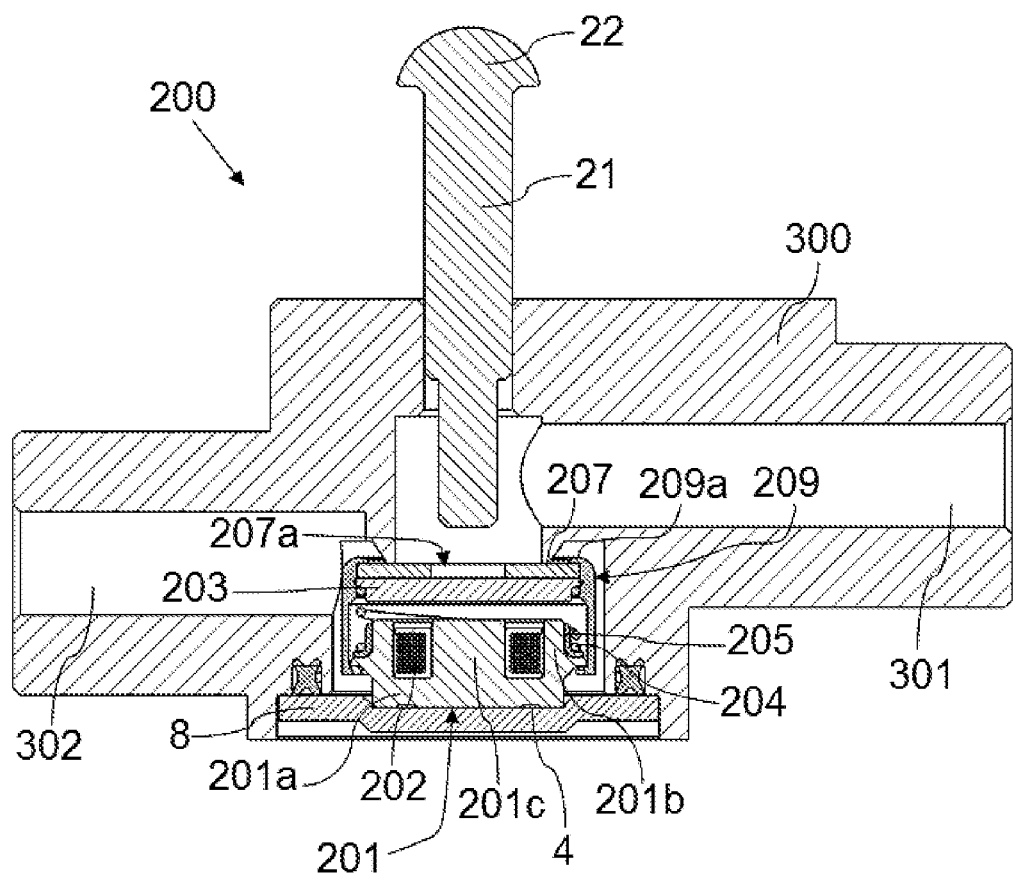
FIG. 3 shows the electromagnetic valve of the gas cock of FIG. 1 in the closing position and with the cock shaft of said gas cock.
Figure 4:
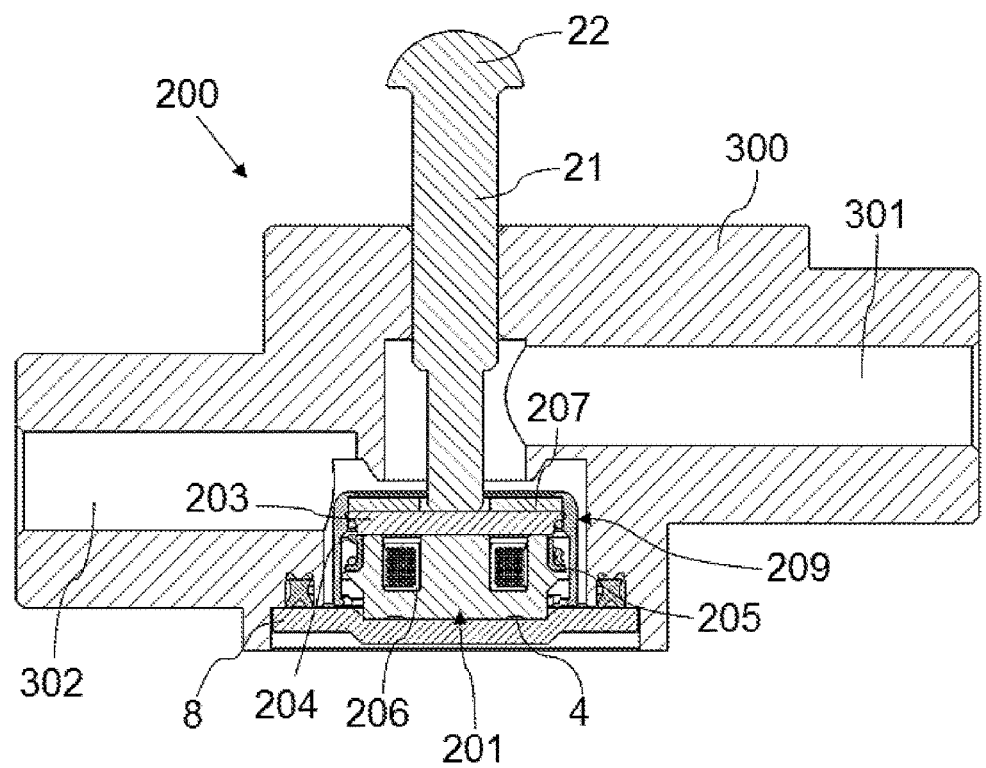
FIG. 4 shows the electromagnetic valve of the gas cock of FIG. 1 in the opening position and with the cock shaft of said gas cock having been moved.

The gas cock 2 comprises an electromagnetic valve 200 arranged between the gas burner 1 and the gas intake 9 of the gas appliance 100, which allows the passage of gas therethrough in an opening position, depicted in FIGS. 2 and 4, fluidically communicating the gas intake 9 with the gas burner 1 through the gas cock 2 (depicted with an arrow G in FIG. 2), allowing the gas to reach said gas burner 1, and which prevents the passage of gas therethrough in a closing position, depicted in FIGS. 1 and 3, closing the gas passage from the gas intake 9 to the gas burner 1 and preventing the gas from reaching said gas burner 1. The gas cock 2 further comprises a cock shaft 21 which moves when said gas cock 2 is pressure-activated (by means of a knob-type actuator 22 for example, which is accessible from outside the gas cock 2 and the gas appliance 100, and connected to the cock shaft 21), causing the electromagnetic valve 200 to go to the opening position (if said electromagnetic valve 200 is not in the opening position).

The gas cock 200 can be housed in a valve body 300, comprising a first conduit section 302 through which the valve body 300 receives the gas (from the gas intake 9 for example), and a second conduit section 301 through which the gas exits the valve body 300 to the corresponding gas burner 1. When the electromagnetic valve 200 is in the opening position, it allows fluidic communication between the conduit sections 301 and 302, allowing the passage of gas from the gas intake 9 to the gas burner 1. However, when the electromagnetic valve 200 is in the closing position it prevents fluidic communication between the conduit sections 301 and 302, closing the passage and preventing the passage of gas from the gas intake 9 to the gas burner 1.

The electromagnetic valve 200 comprises a static element 201 electrically connected to the signal line 4, a coil 202 wounded around said static element 201, and a moving element 203. The arrangement of elements 201 and 203 and of the coil 202 allows the moving element 203 to move closer to or away from the static element 201, opening or closing the electromagnetic valve 200, or it even allows the moving element 203 to remain in position (adhered to or separated from the static element 201), according to the power supply of the coil 202 (according to the electric current passing through the coil 202).

The gas appliance 100 comprises a control device 3 responsible for controlling the supply of the coil 202 of the electromagnetic valve 200 and is communicated with the gas cock 2 through a signal line 4 (at least one signal carrying means, such as a cable, wire, track, for example, or a combination thereof). The moving element 203 is arranged between the static element 201 and the cock shaft 21 such that it moves being pushed by the cock shaft 21 when the latter moves as the gas cock 2 is pressure-activated, the electromagnetic valve 200 thereby being caused to go to the opening position. The signal line 4 is thereby electrically connected to the cock shaft 21 through the static element 201 and the moving element 203 of the electromagnetic valve when the gas cock 2 is pressure-activated, an opening signal representative of said electrical connection being transmitted to the control device 3 through the signal line 4. The opening signal is representative of the electrical connection between the cock shaft 21 and the signal line 4, and is preferably a pulse. In this case the supply of the coil 202 would be responsible for keeping the electromagnetic valve 200 open, keeping the moving element 203 adhered to the static element 201 not yet being pressed by the cock shaft 21.

Figure 5:
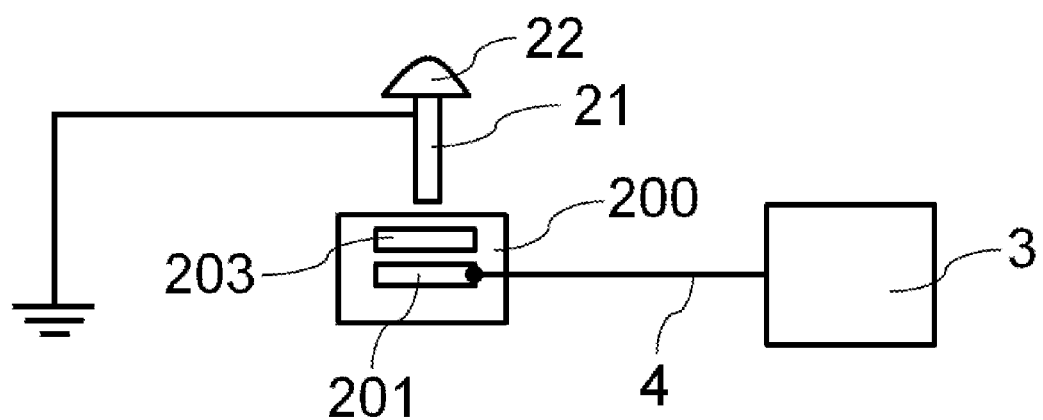
FIG. 5 depicts the operation mode like an electric switch of the electromagnetic valve of the gas cock according to FIG. 1.

The electromagnetic valve 200 is therefore designed to operate like an electric switch as depicted by way of example in FIG. 5, which closes when the cock shaft 21 is moved as a result of pressure activation of the flow valve 2, causing the electromagnetic valve 200 to go to the opening position. The movement of said cock shaft 21 is depicted with the arrow "A" in FIG. 1. Given this situation, the cock shaft 21 is electrically connected to the signal line 4, resulting in the aforementioned opening signal.

The control device 3 of the gas appliance 100 receives the opening signal through the signal line 4 and acts accordingly. Preferably, the control device 3 causes the coil 202 of the electromagnetic valve 200 to be powered when it receives the opening signal in order to keep the electromagnetic valve 200 open, in order to keep the moving element 203 adhered to the static element 201, despite the fact that the cock shaft 21 returns to its position and no longer pushes the moving element 203. Furthermore, one end of the coil 202 is preferably electrically connected to the signal line 4. If the cock shaft 21 is no longer pressed, the moving element 203 may return to its initial position, causing the electromagnetic valve 200 to close. The static element 201 and the moving element 202 are metallic, such that when the coil 202 is suitably powered, a magnetic field drawing the moving element 203 towards the static element 201 is generated, the moving element 203 thereby being kept in said position at least as long as said power supply of the coil 202 is maintained (and therefore the electromagnetic valve 200 is kept open). No explanation with further detail is provided for the operation of an electromagnetic valve of this type as it is well-known for a person skilled in the art.

The signal line 4 is attached to the static element 201 of the electromagnetic valve 200, thereby being electrically connected to said static element 201. The moving element 203 is arranged between the cock shaft 21 and the static element 201, facing both the cock shaft 21 and the static element 201. Therefore, when the cock shaft 21 is moved by pressure activation of the flow valve 2, there comes a time when the cock shaft 21 comes into contact with the moving element 203 and moves it towards the static element 201 as said cock shaft 21 is moved. The cock shaft 21, the moving element 203 and the static element 201 are arranged such that the movement of the cock shaft 21 when it is pressure-actuated causes the movement of the moving element 203 by contact until said moving element 203 comes into contact with the static element 201. Therefore, since the static element 201 is attached and electrically connected to the signal line 4, when the moving element 203 comes into contact with the static element 201 pushed by the cock shaft 21, said cock shaft 21 is electrically connected to the signal line 4 through the moving element 203 and the static element 201.

Therefore, since the coil 202 itself does not intervene in the detection of pressure actuation of the cock shaft 21, the pressure actuation on the gas cock 2 is transferred to the signal line 4 in a simple manner, and with a design of the electromagnetic valve 200 having a simple construction, through the moving element 203 and the static element 201 of the electromagnetic valve 200. For example, it is not necessary to leave an end of the coil 202 of the electromagnetic valve 200 free, as occurs in the valve described in patent document EP1657492A2, which greatly complicates the construction thereof.

According to some embodiments the cock shaft 21 is electrically grounded (through a casing of the gas cock 2 itself, for example), the opening signal representing the grounding of the signal line 4 through the cock shaft 21, and the elements 201 and 203 of the electromagnetic valve 200.

Figure 6:
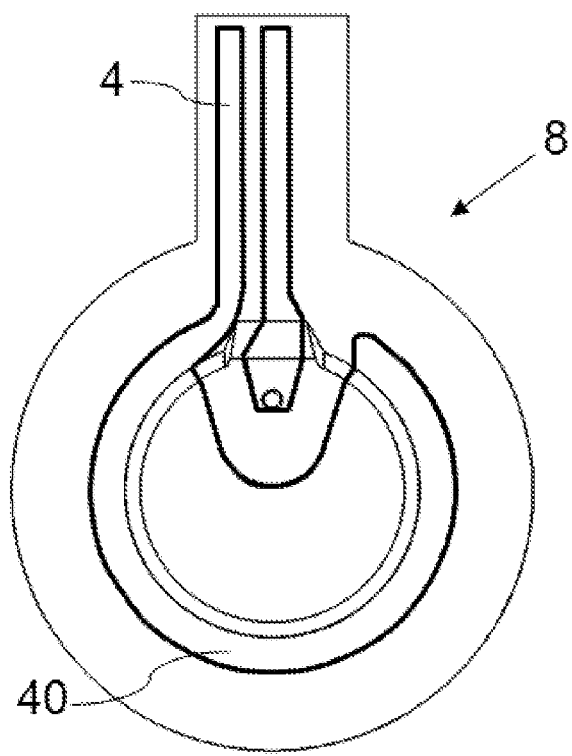
FIG. 6 is a plan view of the printed circuit board of the gas cock of FIG. 1, where the signal line is shown.

To even further facilitate the construction and the design of the electromagnetic valve 200, said electromagnetic valve 200 comprises a printed circuit board 8 on which the static element 201 is arranged. The static element 201 is attached to said printed circuit board 8 in a known manner (for example, by means of welding in an area 40), and the signal line 4 can correspond, at least in part, with an electrical track of the printed circuit board 8 itself, as shown in FIG. 6. Therefore, one end of the signal line 4 is attached to the static element 201 in a simple manner. For example, the signal line 4 can be attached to the static element 201 at the same point where said static element 201 is attached to the printed circuit board 8 by welding. The control device 3 could be arranged on the printed circuit board 8, in which case the signal line 4 would be an electrical track of the printed circuit board 8 itself with one end attached to the static element 201 and the other end attached to the control device 3, and in which case the control device 3 could be part of the gas cock 2 itself. However, preferably the control device 3 is not arranged in the printed circuit board 8 of the gas cock 2, and is arranged in another part of the gas appliance 100 (usually on another printed circuit board), and in this case the signal line 4 would be, for example, an electrical track in the printed circuit board 8 extending from its end attached to the static element 201 to a connector arranged in the printed circuit board 8, the opening signal then being taken through a cable extending from the connector of the printed circuit board 8 to a similar connector of the printed circuit board where the control device 3 is arranged, and through an electrical track extending in said printed circuit board from said latter connector to the control device 3.

In some embodiments the gas cock 2 comprises a returning spring 204 in the electromagnetic valve 200 for causing the moving element 203 to move away from the static element 201 in the absence of power supply in the coil 202 (or when the supply is not sufficient or is a reversed-polarity supply). The electromagnetic valve 200 is designed in this case for the returning spring 204 to be compressed when the electromagnetic valve 200 is open, such that in the absence of supply on the coil 202 (or when the supply is not sufficient or is a reversed-polarity supply), the returning spring 204 expands in order to recover its at-rest shape and with said expansion moves the moving element 203, which moves away from the static element 201, causing the electromagnetic valve 200 to go to the closing position. In order for the electromagnetic valve 200 to be kept in that position, the coil 202 has to be powered with a given electric current, such that together with the moving element 203 and the static element 201, it generates a magnetic field with sufficient force against the force that the returning spring 204 makes in order to not be compressed. If the electric current through the coil 202 is not sufficient, if there is no electric current or if an electric current in the opposite direction is injected, the returning spring 204 does not have sufficient force against the force which it generates in order to not be compressed, and it decompresses (expands).

The returning spring 204 is supported against the moving element 203 and the static element 201, preferably comprising an end against each of said elements 201 and 203. Therefore, when the returning spring 204 decompresses, it pushes the moving element 203 in the opposite direction with respect to the static element 201, causing said moving element 203 to move away from the static element 201 (which remains static at all times) and thereby causing the electromagnetic valve 200 to close.

The springs are manufactured with spring materials, which may be electrical conductors. Therefore, in some embodiments in which the gas cock 2 comprises a returning spring 204, said gas cock 2 further comprises isolating means in the electromagnetic valve 200 for preventing electrical contact between the static element 201 and the moving element 203 through the returning spring 204. Therefore, said electrical contact only occurs when both elements 201 and 203 are in contact with one another. Without the isolating means, the elements 201 and 203 would be electrically connected at all times through the returning spring 204, and the cock shaft 21 would be in electrical contact with the signal line 4 as soon as the cock shaft 21 comes into contact with the moving element 203, without the moving element 203 having to come into contact with the static element 201, which would generate an opening signal without the electromagnetic valve 200 being in the opening position. The isolating means prevents, for example, slight pressure on the flow valve 2 (which can be accidental) from causing the coil 202 to be powered by the control device 3 (in response to an opening signal), without the electromagnetic valve 200 being open or having to open. Therefore, the opening of said electromagnetic valve 200, and its staying in said position, are ensured only if the cock shaft 21 is deliberately acted on, whereby the overall safety of the gas valve, and therefore also of the gas appliance 100 where said gas cock 2 may be arranged, increases.

The isolating means can comprise a coating applied on the returning spring 204, the coating being made of an electrically non-conductive material keeping the returning spring 204 electrically isolated, electrical contact between the elements 201 and 203 thereby being prevented through the returning spring 204.

According to some embodiments the isolating means comprises an isolating element 205 made of an electrically non-conductive material (such as, for example, plastic), arranged between the returning spring 204 and the static element 201 (as shown in FIGS. 3 and 4), between the returning spring 204 and the moving element 203, or between the returning spring 204 and the static element 201 on one hand and the returning spring 204 and the moving element 203 on the other. The isolating element 205 is trapped without freedom of movement between the returning spring 204 and the corresponding element 201 and/or 203 (or it could even be attached to at least one of the elements 201 and 203), the absence of electrical contact between the elements 201 and 203 through the returning spring 204 being ensured as a result of said isolating element 205.

According to some embodiments the static element 201 of the electromagnetic valve 200 comprises a circular base 201a, a first hollow cylindrical segment 201b concentric to the circular base 201a, extending from the circular base 201a, and a second solid cylindrical segment 201c, concentric to the circular base 201a and on which the coil 202 is wound, extending from the circular base 201a and comprising a radius less than the radius of the first cylindrical segment 201b. Upon coming into contact with the static element 201, the moving element 203 comes into contact with the first cylindrical segment 201b and/or the second cylindrical segment 201c. If the electromagnetic valve 200 comprises a returning spring 204, said returning spring 204 is arranged between the first cylindrical segment 201b and the moving element 203, supported against the outside of the first cylindrical segment 201b and against the moving element 203. This support is not direct in the case of the presence of the isolating means (the support would be through the isolating element 205 in the corresponding case or through the coating of the returning spring 204).

According to some embodiments the electromagnetic valve 200 comprises a reel 206 fixed to the static element 201 and made of an electrically non-conductive material, where the coil 202 is arranged, for preventing electrical contact between the static element 201 and coil 202.

According to some embodiments the electromagnetic valve 200 comprises a closure element 207 made from an elastic material arranged on the moving element 203, the moving element 203 being arranged between the closure element 207 and the static element 201. The moving element 203 may be in contact with the closure element 207, which moves integrally with said moving element 203. The closure element 207 may comprise a through hole 207a through which the cock shaft 21 passes when it is pressure-activated, in order for said cock shaft 21 to be able to come into electrical contact with the static element 201. The through hole 207 is preferably centered.

According to some embodiments the electromagnetic valve 200 comprises a cover 209 at least partially surrounding the elements 201 and 203, the coil 202, and the closure element 207 (if there is one). The cover 209 may comprise a cylindrical shape and is hollow, said elements 201 and 203, said coil 202 and said closure element 207 (if there is one) being arranged in the gap defined by said cover 209. At each of its longitudinal ends, the cover 209 can comprise radial flanges 209a extending towards the inside of the gap, to prevent the parts of the electromagnetic valve 200 arranged in the gap defined by said cover 209 from being able to accidentally come out of said cover 209. The moving element 203 can be attached to the cover 209, such that the cover 209 moves integrally with the moving element 203. The moving element 203 may be attached to the cover 209 by pressure. If there is a closure element 207, said closure element 207 would also be attached, preferably by pressure, to the cover 209. The cover 209 is preferably made from an electrically non-conductive material, such as plastic.

What is claimed is:

1. A gas cock comprising:
   a valve body having a gas inlet and a gas outlet,
   a closure element moveable between an open position and a closed position, in the open position the closure element permits the flow of gas between the gas inlet and gas outlet, in the closed position the closure element prevents the flow of gas between the gas inlet and gas outlet,
   an electromagnetic actuator comprising:
     an electrically conductive static element having a first side and a second side,
     an electrically conductive moving element having a first side and a second side, the closure element being coupled to the first side of the moving element so that the closure element moves with the moving element, the second side of the moving element facing the first side of the static element, the moving element moveable between a first position and a second position, the first position corresponding to the closed position of the closure element, the second position corresponding to the open position of the closure element,
     an electrically conductive actuating shaft having a first end that resides outside the valve body and a second end that resides inside the valve body, the actuating shaft being moveable between a first position wherein a gap exists between the second end of the actuator shaft and the first side of the moving element, and a second position wherein the second end of the actuator shaft pushes against the first side of the moving element to cause the second side of the moving element to contact the first side of the static element, the second position of the actuating shaft corresponding to the open position of the closure element,
     a signal line electrically connected to the static element, when the actuator shaft is in the second position the actuator shaft is electrically connected to the signal line through the moving element and the static element such that in use a signal indicative that the closure element is in the open position is generated in the signal line when the actuator shaft is in the second position.

2. The gas cock according to claim 1, where in the actuator shaft is electrically grounded, the signal being generated in the signal line as a result of the signal line being grounded through the actuator shaft.

3. The gas cock according to claim 1, wherein the signal line resides on a printed circuit board onto which the static element is electrically attached.

4. The gas cock according to claim 3, wherein the static element is physically attached to the printed circuit board.

5. The gas cock according to claim 3, further comprising a controller that is located on the printed circuit board and that is electrically coupled to the signal line.

6. The gas cock according to claim 1, further comprising a resilient member disposed between the first side of the static element and the second side of the moving element, the resilient member continuously urging the moving element toward the first position.

7. The gas cock according to claim 6, wherein the resilient member is a spring.

8. The gas cock according to claim 6, wherein the resilient member is electrically isolated from one or both of the static and moving elements.

9. The gas cock according to claim 6, further comprising a non-electrically conductive member disposed between the resilient member and one or both of the static and moving elements.

10. The gas cock according to claim 6, wherein the resilient member is coated with a non-electrically conductive member.

11. The gas cock according to claim 6, further comprising a coil wound about at least a portion of the static element such that when a threshold amount of current passes through the coil a magnetic field is generated that causes the moving element to move toward the static element so that the second side of the moving element contacts the first side of the static element.

12. The gas cock according to claim 11, wherein the static element comprises a hollow cylindrical segment and a solid cylindrical segment on which the coil is wound, the solid cylindrical segment comprising a radius less than a radius of the hollow cylindrical segment, the moving element contacting the hollow cylindrical segment and/or the solid cylindrical segment when the moving element is in the second position.

13. The gas cock according to claim 12, wherein the resilient member is arranged between an outer surface of the hollow cylindrical segment and the moving element.

14. The gas cock according to claim 1, further comprising a coil wound about at least a portion of the static element such that when a threshold amount of current passes through the coil a magnetic field is generated that causes the moving element to move toward the static element so that the second side of the moving element contacts the first side of the static element.

15. The gas cock according to claim 14, wherein an end of the coil is electrically connected to the signal line.

16. The gas cock according to claim 1, wherein the closure element is made of a non-electrically conductive material and includes a through hole through which the second end of the actuator shaft passes when the actuator shaft is in the second position.

17. The gas cock according to claim 16, wherein the closure element is made of a plastic material.

18. The gas cock according to claim 1, wherein the electromagnetic actuator is housed inside a cover, the moving element being attached to the cover such that the cover moves integrally with the moving element.

19. The gas cock according to claim 18, wherein the moving element and the cover are press-fit together.

20. The gas cock according to claim 19, wherein the cover is made of a non-metallic material.

* * * * *